(12) United States Patent
Ishizaki et al.

(10) Patent No.: US 11,362,861 B2
(45) Date of Patent: Jun. 14, 2022

(54) OPERATING DEVICE

(71) Applicant: Honda Motor Co., Ltd., Tokyo (JP)

(72) Inventors: Ryusuke Ishizaki, Saitama (JP);
Hotaka Shimomura, Saitama (JP);
Azumi Saito, Saitama (JP); Shun Ogiwara, Saitama (JP); Yoshiki Maezawa, Saitama (JP); Tomohiro Chaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/141,229

(22) Filed: Jan. 5, 2021

(65) Prior Publication Data

US 2021/0234726 A1    Jul. 29, 2021

(30) Foreign Application Priority Data

Jan. 28, 2020  (JP) .............................. JP2020-011410

(51) Int. Cl.
*H04L 12/42*    (2006.01)

(52) U.S. Cl.
CPC .................... *H04L 12/42* (2013.01)

(58) Field of Classification Search
CPC ....... H04L 12/42; H04L 12/423; H04L 12/54; H04L 12/56; H04L 12/5609; H04L 12/5612
See application file for complete search history.

(56) References Cited

U.S. PATENT DOCUMENTS

| 8,374,725 | B1 * | 2/2013 | Ols ........................ G05D 27/02 261/118 |
| 10,230,428 | B1 * | 3/2019 | Barzegar .................. H04B 3/56 |
| 2015/0224845 | A1 * | 8/2015 | Anderson ............ B60G 17/052 701/37 |
| 2016/0109874 | A1 * | 4/2016 | Holmes ................. E21B 33/064 700/275 |
| 2017/0291806 | A1 * | 10/2017 | Lessing ..................... B67C 3/24 |
| 2018/0284758 | A1 * | 10/2018 | Celia .................... G06N 3/0454 |
| 2019/0150072 | A1 * | 5/2019 | Barzegar ............. H04W 56/001 370/338 |
| 2019/0349218 | A1 * | 11/2019 | Hoglund ................ H04L 12/10 |
| 2019/0379953 | A1 * | 12/2019 | Yuang ................ H04Q 11/0005 |

(Continued)

FOREIGN PATENT DOCUMENTS

| FR | 3044296 A1 * | 6/2017 | ............ B60T 13/741 |
| JP | 2019042856 | 3/2019 | |

(Continued)

*Primary Examiner* — Kevin D Mew
(74) *Attorney, Agent, or Firm* — JCIPRNET

(57) ABSTRACT

Provided is a modular type operating device capable of controlling the operation after assembly regardless of the assembly order of multiple modules. A base of a robot transmits an ID change request signal to an active module on a downstream side of a ring network. When each module receives the ID change request signal, it rewrites HOP of the ID change request signal to a value incremented by 1 and transmits it to the module on the downstream side or the base, creates a new ID to indicate the connection order and type of each module based on the HOP before rewriting and the physical ID, and transmits a module information signal including the new ID and the like to the module on the downstream side or the base.

4 Claims, 12 Drawing Sheets

(56) References Cited

U.S. PATENT DOCUMENTS

2020/0405375 A1* 12/2020 Shelton, IV ....... A61B 17/1155
2020/0405414 A1* 12/2020 Shelton, IV ........... A61B 34/37

FOREIGN PATENT DOCUMENTS

| WO | WO-2007006175 A1 | * | 1/2007 | .......... H04J 14/0241 |
|---|---|---|---|---|
| WO | WO-2007104417 A2 | * | 9/2007 | ......... H04B 10/1149 |
| WO | WO-2019099111 A1 | * | 5/2019 | ........... G05B 19/042 |
| WO | WO-2020264336 A1 | * | 12/2020 | ......... G05B 13/0265 |

\* cited by examiner

| Module No. | 3X | 4X | 3Y | 4Y | 3Z | 4Z |
|---|---|---|---|---|---|---|
| HOP | 0 | 1 | 2 | 3 | 4 | 5 |
| Physical ID | 0x0 | 0x1 | 0x0 | 0x1 | 0x0 | 0x1 |
| Logical ID | 0x3F | 0x3F | 0x3F | 0x3F | 0x3F | 0x3F |
| Provisional ID | 0x00 | 0x01 | 0x02 | 0x03 | 0x04 | 0x05 |
| New ID | 0x00 | 0x41 | 0x02 | 0x43 | 0x04 | 0x45 |

FIG. 11

OPERATING DEVICE

CROSS-REFERENCE TO RELATED APPLICATION

This application claims the priority benefit of Japan application serial no. 2020-011410, filed on Jan. 28, 2020. The entirety of the above-mentioned patent application is hereby incorporated by reference herein and made a part of this specification.

BACKGROUND

Technical Field

The disclosure relates to a modular type operating device which is operably assembled by connecting multiple modules in series to a command module.

BACKGROUND

Description of Related Art

Conventionally, a robot described in Patent Document 1 is known as an operating device. This robot is of an articulated arm robot type and includes one control unit, two rotation units, three bending units, and an end effector as composing units. In the case of this robot, the robot is assembled by connecting the above-mentioned composing units in series, and after the assembly, the composing units are connected in a daisy chain.

Then, after the robot is assembled, a request signal is broadcast and transmitted from the control unit to the composing units in order to confirm whether each composing unit is assembled in a predetermined order. Along with this, configuration data is generated in the configuration unit from the bottom to the top so as to include the connection numbers and identification codes of those components, and then transmitted to the control unit.

The control unit then generates the configuration data to include its own connection number and identification code and transmits it to a mobile terminal. Then, the mobile terminal compares the configuration data from the control unit with collation data, and confirms whether the control unit and each composing unit are assembled in the predetermined order. As a result, when the control unit and each composing unit are assembled in the predetermined order, the operation of the robot can be controlled by the control unit.

Related Art

Patent Document

[Patent Document 1] Japanese Laid-open No. 2019-42856

According to the conventional robot, when the control unit and each composing unit are not assembled in the predetermined order, there is a problem that the control unit cannot control the operation of the robot unless the robot assembly work is redone in the predetermined order. This problem is not limited to robots, but also occurs in a modular type operating device which is operably assembled by connecting multiple modules in series.

The disclosure has been made to solve the above problems and provides a modular type operating device capable of controlling the operation after assembly regardless of the assembly order of multiple modules.

SUMMARY

In view of the above, according to an embodiment of the disclosure, an operating device 1 is of a modular type, which connect multiple modules (active modules 3 and passive modules 4) in series and detachably, which is assembled by detachably connecting a module (the active module 3) on one end side of the multiple modules connected in series to a command module (a base 2), whose operation is controlled by a control command from the command module, and in which a ring network RN capable of transmitting data in one direction is formed when the module on the one end side is connected to the command module. The command module includes: a confirmation data generation part (a controller 2a, STEP4) which generates confirmation data (an ID change request signal) with a rewritable data area; and a data transmission and reception part (the controller 2a, STEP4 and STEP5) capable of transmitting the confirmation data to the module (the active module 3) on a downstream side in the one direction of the ring network RN and capable of receiving various data from the module (the passive module 4) on an upstream side in the one direction of the ring network RN. Each of the multiple modules includes: a data reception part (controllers 3a, 4a, STEP11, STEP14 and STEP23) capable of receiving the confirmation data and data other than the confirmation data from one of the command module and each of the modules on the upstream side in the one direction of the ring network RN; a relay number rewriting part (the controllers 3a, 4a, and STEP13) which rewrites a relay number (HOP) included in the data area of the confirmation data to a value incremented by 1 when the confirmation data is received by the data reception part; a storage part (memories 3b, 4b) which stores identification information indicating a type of each of the modules; a new identification information creation part (the controllers 3a, 4a, and STEP22) which creates new identification information (a new ID) that is novel identification information of each of the modules to indicate a connection order and the type of each of the modules based on the relay number (the HOP) of the confirmation data received by the data reception part and the identification information (a physical ID) of each of the modules stored in the storage part; and a data transmission part (the controllers 3a, 4a, STEP14 and STEP23) capable of transmitting the confirmation data whose relay number has been rewritten by the relay number rewriting part and new identification information data including the new identification information to one of the command module and each of the modules on the downstream side in the one direction of the ring network RN.

BRIEF DESCRIPTION OF THE DRAWINGS

FIG. 11 is a diagram for illustrating a method of creating a new ID.

DESCRIPTION OF THE EMBODIMENTS

Figure 1:
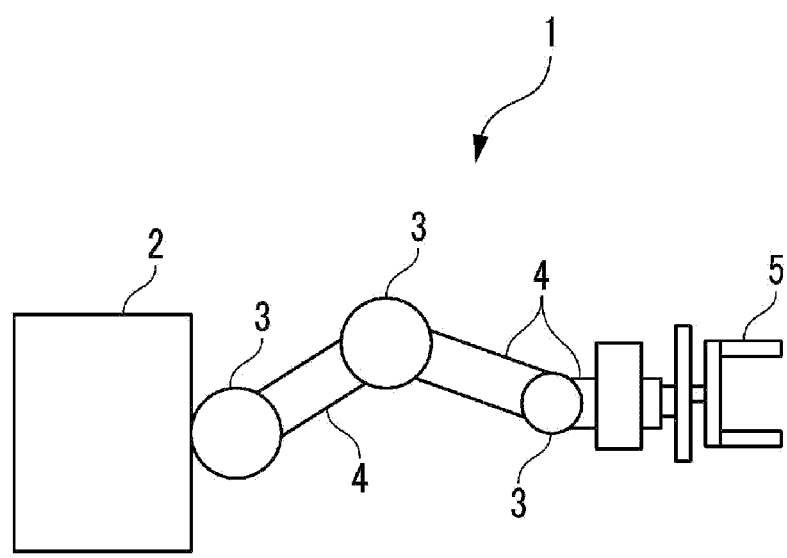
FIG. 1 is a diagram showing an example of an assembly state of a robot as an operating device according to an embodiment of the disclosure.

According to this operating device, when the confirmation data is transmitted from the data transmission and reception part of the command module to the module on the downstream side in the one direction of the ring network, the confirmation data is received by the data reception part of this module. Along with this, in the relay number rewriting part of the module, the relay number included in the data area of the received confirmation data is rewritten to a value incremented by 1, and the confirmation data whose relay number has been changed is transmitted from the data transmission part to one of the command module and the module on the downstream side in the one direction of the ring network. Then, when the confirmation data whose relay number has been changed is received by the data reception part of the module on the downstream side, the same operation as described above is executed in the relay number rewriting part and the data transmission part of this module.

Further, in the new identification information creation part of the module, new identification information that is novel identification information of each of the modules is created to indicate the connection order and the type of each of the modules based on the relay number of the confirmation data received by the data reception part and the identification information of each of the modules stored in the storage part. In this case, as described above, since the relay number in each module is a value incremented by 1 each time when the confirmation data is transmitted or received, the relay number in the confirmation data indicates the connection order of each module in the multiple modules connected in series. In this way, by creating the new identification information based on the relay number of the confirmation data and the identification information of each module stored in the storage part, the new identification information can be created to appropriately indicate the connection order and type of each module.

Then, since the new identification information data including the new identification information is transmitted to one of the command module and the module on the downstream side in the one direction of the ring network, this new identification information data will eventually reach the command module via the ring network and the modules. In this way, after the operating device is assembled, the command module can appropriately obtain the connection states of what types of modules are connected in what order based on the new identification information from each module. As a result, after the operating device is assembled, the command module can appropriately determine the control command according to these connection states, and can optimally control the operating device by the control command.

According to an embodiment of the disclosure, in the operating device as described above, the type of the module has two types including an active module 3 with an actuator 3c and a passive module 4 without an actuator.

According to this operating device, since the new identification information includes information indicating the types of active modules and passive modules, the command module can appropriately obtain information on the order in which these active modules and passive modules are connected. As a result, after the operating device is assembled, the operating device can be optimally controlled by the control command of the command module.

According to an embodiment of the disclosure, in the operating device as described above, the storage part (the memories 3b, 4b) of the module (the active modules 3 and the passive modules 4) further stores mechanical information indicating at least one of a physical property and an operating characteristic of the module. In addition to the confirmation data and the new identification information data, the data transmission part (the controllers 3a, 4a) of the module is capable of transmitting mechanical information data including the mechanical information to one of the command module and the module on the downstream side in the one direction of the ring network RN. The command module (the base 2) further includes a control command determination part (the controller 2a and STEP42) which determines the control command in response to the mechanical information and the new identification information from the multiple modules.

According to this operating device, since in addition to the confirmation data and the new identification information data, the mechanical information data including the mechanical information indicating at least one of the physical property and the operating characteristic of the module is transmitted by the data transmission part of the module to one of the command module and the module on the downstream side in the one direction of the ring network, this mechanical information data will eventually reach the command module via the ring network and the modules. Then, in the operation command determination part of the command module, since the operation command is determined based on the mechanical information and the new identification information from the multiple modules, even if at least one of the physical property and the operation characteristic is different between the modules, the operating device can be optimally controlled in response to the difference between them.

Hereinafter, an operating device according to an embodiment of the disclosure will be described with reference to the drawings. As shown in FIG. 1, a robot 1 as the operating device of the embodiment is of an arm robot type, and includes a base 2, three active modules 3, three passive modules 4, and an end effector 5.

The robot 1 is a modular type robot, and is assembled by connecting these elements 2 to 5 in series, and these elements 2 to 5 are configured to be detachable from each other. Further, in this embodiment, the base 2 corresponds to a command module, and the active modules 3 and the passive modules 4 correspond to modules.

In this robot 1, the active modules 3 and the passive modules 4 are alternately disposed between the base 2 and the end effector 5, and the active module 3 on one end side is connected to the base 2. Further, the end effector 5, a sensor 6 and the like are connected to the passive module 4 on the other end side.

Figure 2:
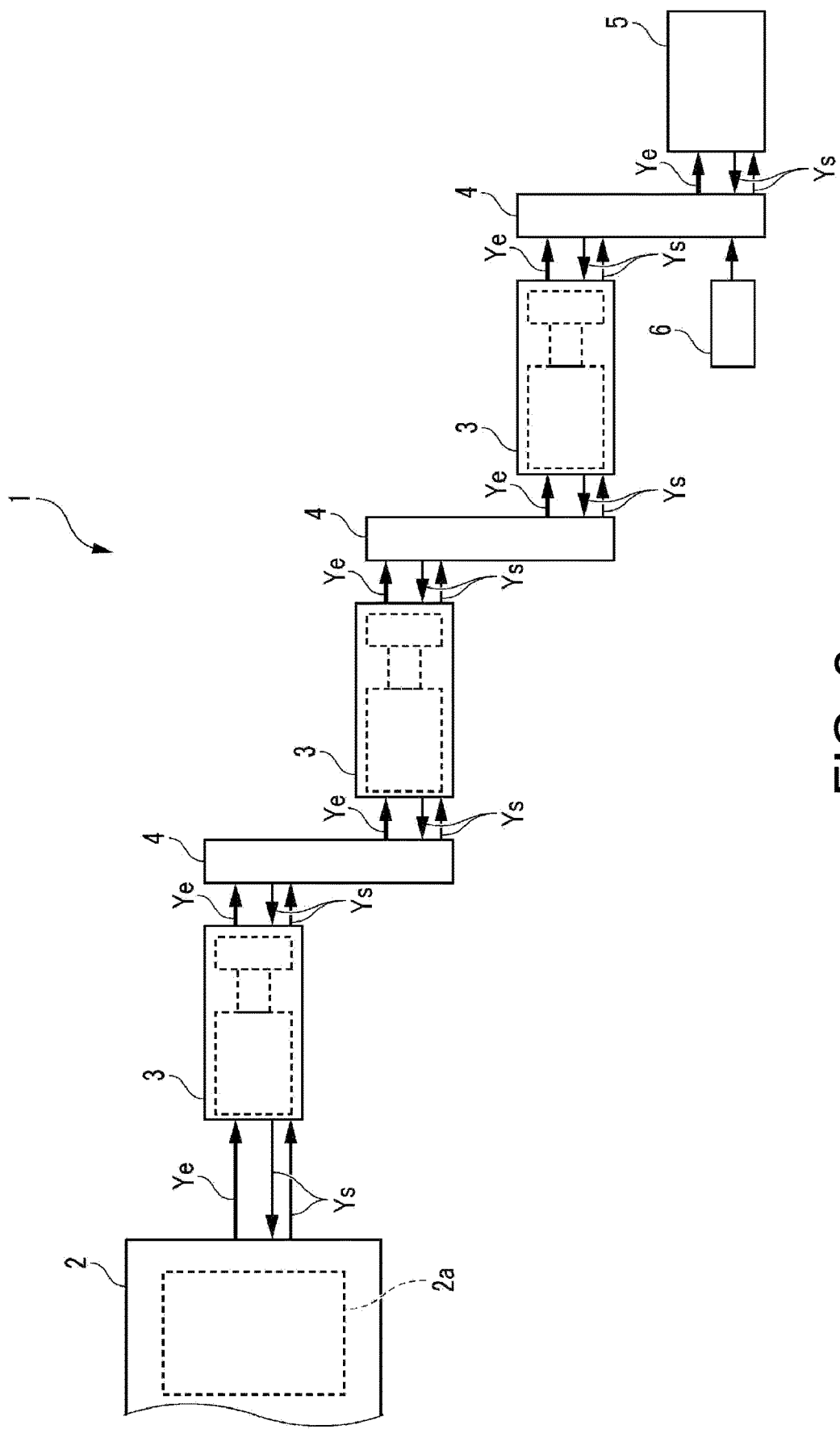
FIG. 2 is an exploded diagram schematically showing an overall configuration of the robot.

As shown in FIG. 2, a controller 2a is built in the base 2. The controller 2a is configured by a microcomputer, and includes a CPU, a memory (RAM, E2PROM, ROM, etc.), a communication circuit, and the like (none of which is shown). The controller 2a executes a first initial communication process and the like as described later.

The controller 2a supplies power to the active modules 3 connected to the base 2 via a power supply line (not shown) as indicated by arrows Ye, and transmits and receives data to and from the active modules 3 via a signal line (not shown), as indicated by two arrows Ys. Further, in the embodiment, the controller 2a corresponds to a confirmation data generation part, a data transmission and reception part, and a control command determination part.

Figure 3:
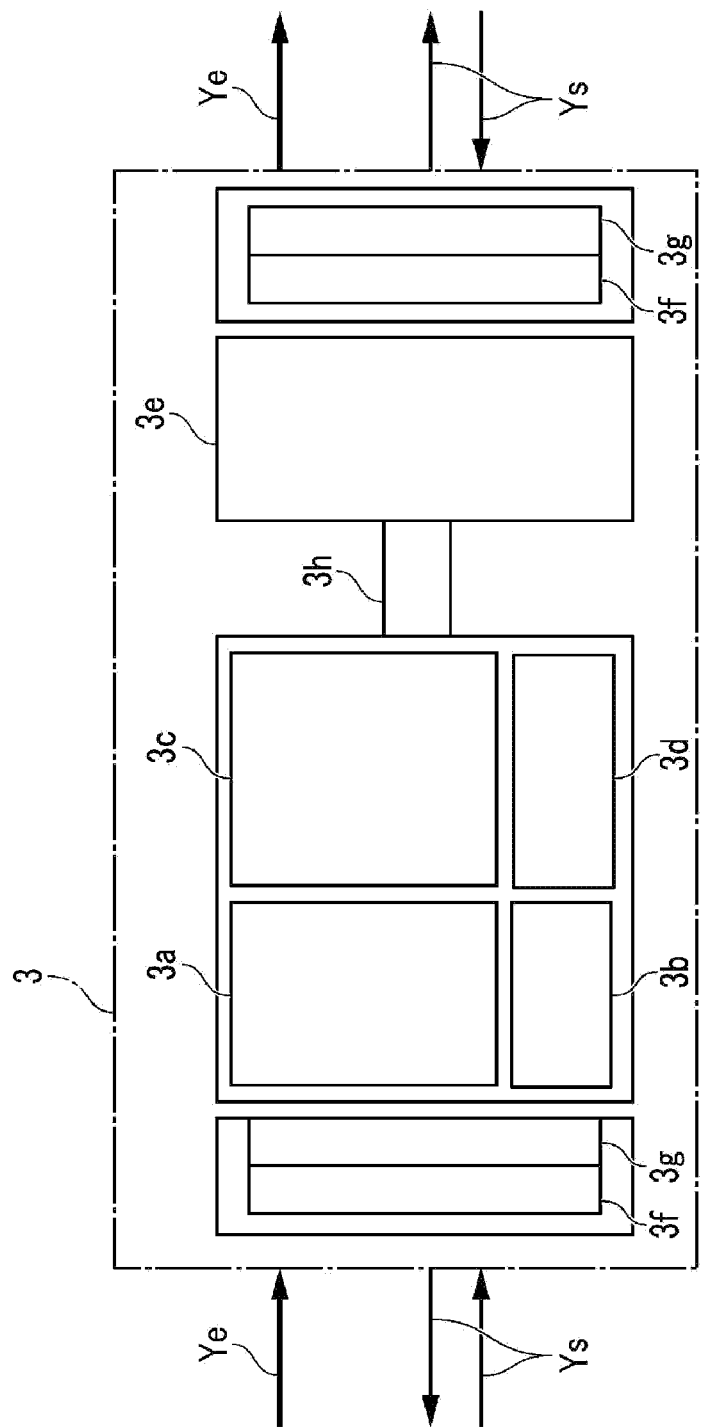
FIG. 3 is a diagram schematically showing a configuration of an active module.

Next, the active modules 3 will be described. The active module 3 configures an active joint of the robot 1, and as shown in FIG. 3, includes a controller 3a, a memory 3b, an actuator 3c, an electromagnetic brake 3d, a reduction gear mechanism 3e, two power supply circuits 3f, 3f, two communication circuits 3g, 3g and the like. Further, in the following description of the active modules 3, the configuration closer to the base 2 is referred to as the "base side," and the configuration farther from the base 2 is referred to as the "opposite base side." This also applies in the description of the passive modules 4.

The controller 3a is configured by a microcomputer like the controller 2a of the base 2, and the controller 3a controls operating states of the actuator 3c and the electromagnetic brake 3d, and executes second and third initial communication processes and the like as described later. Further, in the embodiment, the controller 3a corresponds to a data reception part, a relay number rewriting part, a new identification information creation part, and a data transmission part.

Further, the memory 3b (storage part) is configured by a RAM, an E2PROM, a ROM (none of which is shown) and the like, and the ROM stores ID information representing physical IDs and logical IDs and mechanical information of the active modules 3. In the case of this embodiment, the physical ID is set to "0x0" and the logical ID is set to "0x3F" in each of the three active modules 3 (see FIG. 11 described later).

Further, the mechanical information includes information such as the shape, weight, center of gravity, moment of inertia, joint angle limit, speed limit, current limit and the like of the active modules 3. The three active modules 3 are configured to be different from each other, and thus the mechanical information of these active modules 3 is set to different values from each other.

Further, since the active module 3 can be connected in two directions in terms of the connection direction, the center of gravity, the moment of inertia and the like of the active module 3 will change when it is connected in such different directions. Therefore, the mechanical information of each active module 3 includes two sets of values corresponding to the two connection directions of each active module 3.

Further, the actuator 3c is configured by an electric motor having a built-in sensor, and this sensor detects the rotation angle, rotation speed, and current of the actuator 3c and outputs them to the controller 3a. Further, in the actuator 3c, the output torque is transmitted to the reduction gear mechanism 3e via a rotation shaft 3h, and the rotation of the actuator 3c is braked by the electromagnetic brake 3d. The output torque of the reduction gear mechanism 3e is transmitted to the passive module 4 connected to the opposite base side of the active module 3.

In the active module 3, the power supply from the base 2 or the passive module 4 is executed through the power supply circuit 3f on the base side, and the power supply to the passive module 4 is executed through the power supply circuit 3f on the opposite base side. Further, the communication circuit 3g on the base side executes data transmission and reception with the communication circuit of the base 2 or a communication circuit 4d (to be described later) of the passive module 4, and the communication circuit 3g on the opposite base side executes data transmission and reception with the communication circuit 4d (to be described later) of the passive module 4.

Figure 4:
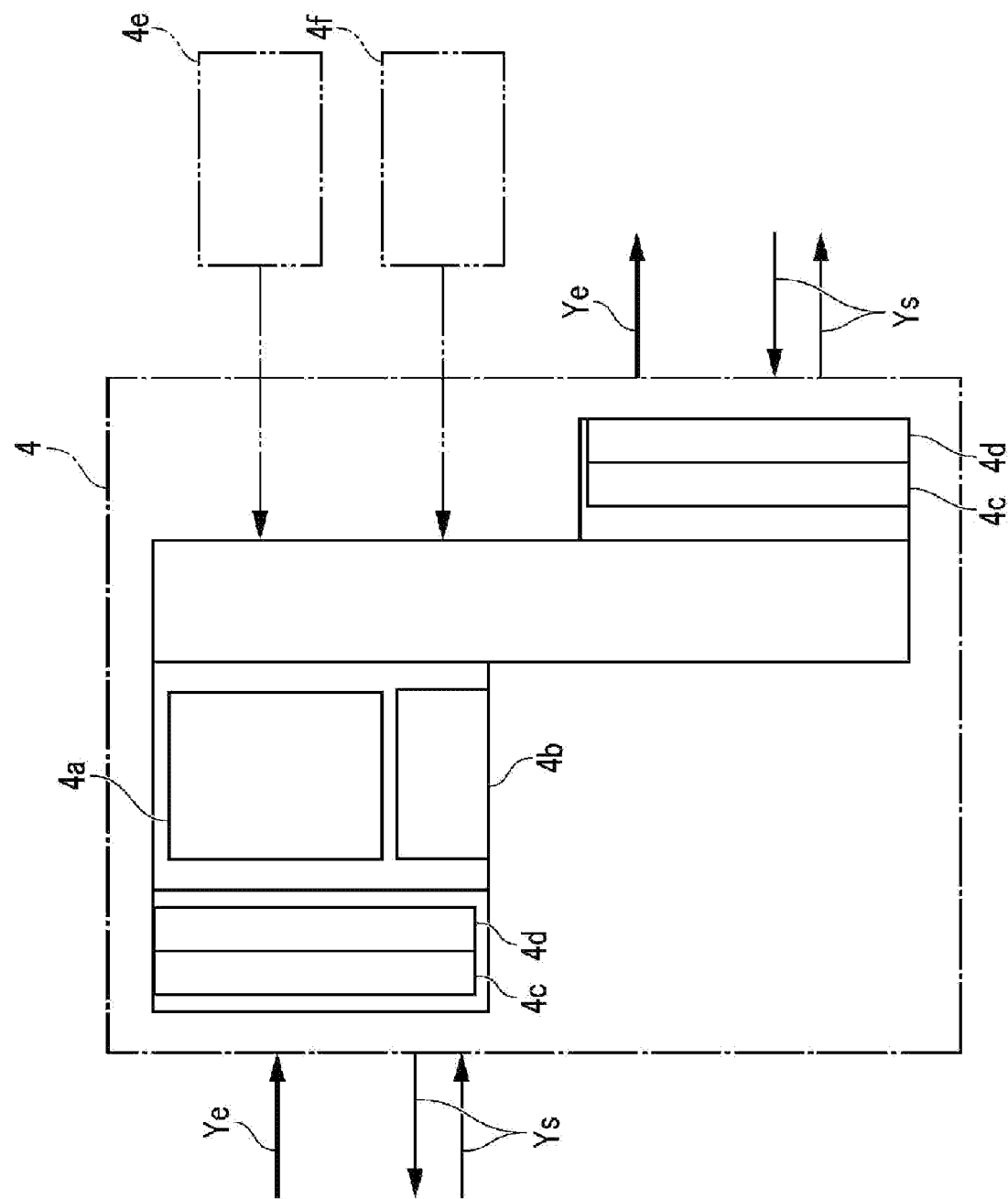
FIG. 4 is a diagram schematically showing a configuration of a passive module.

Next, the passive modules 4 will be described. The passive module 4 configures a link of the robot 1, and as shown in FIG. 4, includes a controller 4a, a memory 4b, two power supply circuits 4c, 4c, two communication circuits 4d, 4d, an internal sensor 4e, an external sensor 4f and the like.

The controller 4a is configured by a microcomputer like the controller 3a of the active module 3, and executes the second and third initial communication processes and the like as described later. Further, in the embodiment, the controller 4a corresponds to a data reception part, a relay number rewriting part, a new identification information creation part, and a data transmission part.

Further, the memory 4b (storage part) is configured by a RAM, an E2PROM, a ROM (none of which is shown) and the like, like the above memory 3b, and the ROM stores ID information representing physical IDs and logical IDs of the passive modules 4 and mechanical information representing the shape, weight, center of gravity, moment of inertia and the like of the passive modules 4. In this case, the physical IDs and the logical IDs of the three passive modules 4 are set to the same values as each other.

Further, since the three passive modules 4 have different shapes, weights, centers of gravity, moments of inertia and the like, the mechanical information is set to different values from each other. Further, like the active module 3, since the passive module 4 can also be connected in two directions in terms of the connection direction, the center of gravity, the moment of inertia and the like of the passive module 4 will change when it is connected in such different directions. Therefore, the mechanical information of each passive module 4 includes two sets of values corresponding to the two connection directions of each passive module 4.

Further, in the passive module 4, the power supply from the active module 3 is executed through the power supply circuit 4c on the base side, and the power supply to the active module 3 or the end effector 5 is executed through the power supply circuit 4c on the opposite base side. Further, the communication circuit 4d on the base side executes data transmission and reception with the communication circuit 3g of the active module 3, and the communication circuit 4d on the opposite base side executes data transmission and reception with the communication circuit 3g of the active module 3 or a communication circuit (not shown) of the end effector 5.

In addition, the internal sensor 4e detects the operating state and the like of the robot 1 and transmits the detection signal to the controller 4a, and it is configured by a sensor which detects the distance and contact with the active module 3 and the like, a position sensor and the like. Further, the external sensor 4f detects the external environment of the robot 1 and transmits the detection signal to the controller 4a, and it is configured by a CCD image sensor and the like.

Next, the first to fourth initial communication processes executed by the robot 1 configured as described above will be described. The first to fourth initial communication processes are for the base 2 to obtain information on the assembly state (for example, information on the connection order of the three active modules 3 and the three passive modules 4) when the robot 1 is assembled. Further, in the following description, the active modules 3 and the passive modules 4 are collectively referred to as the "modules 3, 4" as appropriate.

First, the first initial communication process will be described with reference to FIG. 5. In the first initial communication process, an ID change request signal (confirmation data) (to be described later) is transmitted from the base 2 to the modules 3, 4 via a ring network RN (see FIG. 10 described later) and then received by the base 2, and is executed by the controller 2a of the base 2 when the power of the robot 1 is turned on after the robot 1 is assembled.

Figure 5:
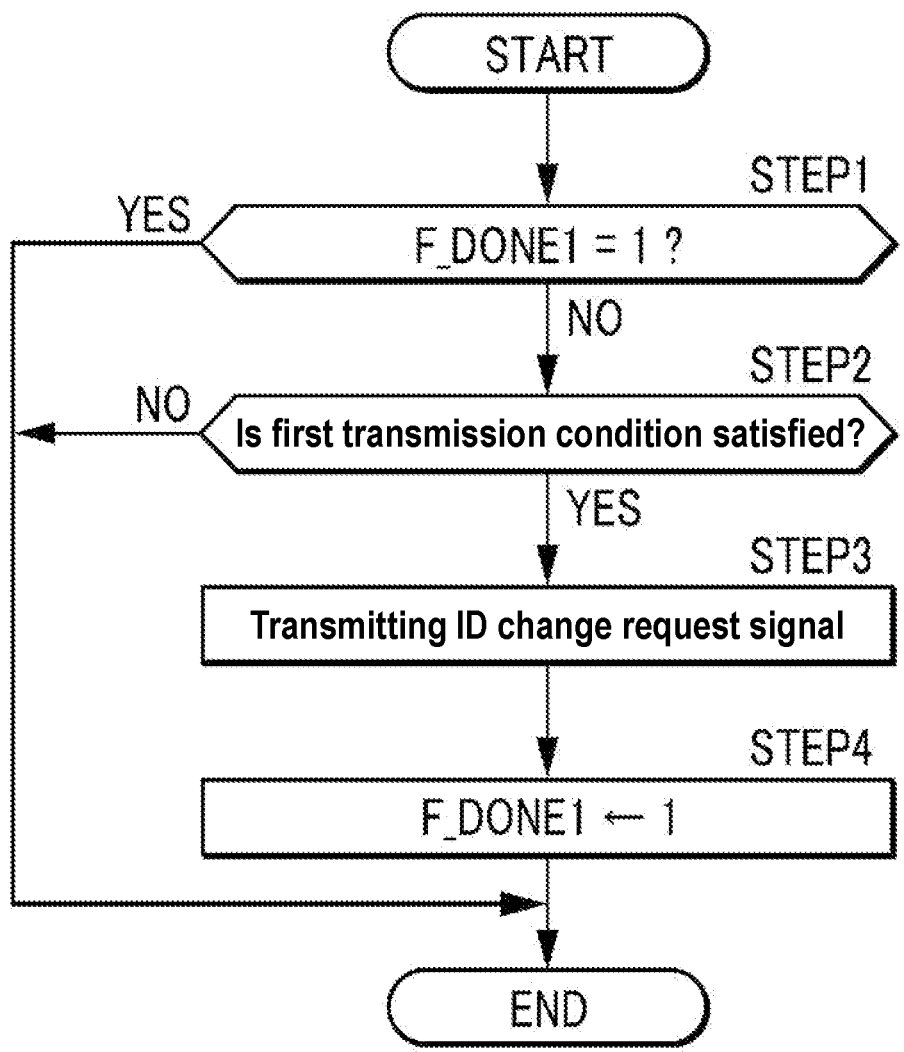
FIG. 5 is a flowchart showing a first initial communication process.

As shown in FIG. 5, first, it is determined whether the first initial communication execution completed flag F_DONE1 is "1" (STEP1 in FIG. 5). The first initial communication execution completed flag F_DONE1 is set to a value "0" at the timing when the power of the robot 1 is turned on. This also applies for various flags to be described later.

When this determination is affirmative (YES for STEP1 in FIG. 5) and the base 2 has already transmitted the ID change request signal to the active module 3X (see FIG. 10) on the downstream side of the ring network RN, this process ends as it is.

On the other hand, when this determination is negative (NO for STEP1 in FIG. 5) and the ID change request signal has not been transmitted, it is determined whether a first transmission condition is satisfied (STEP2 in FIG. 5). The first transmission condition is a transmission condition of the ID change request signal. Specifically, after the power of the base 2 is turned on after the robot 1 is assembled, it is determined that the first transmission condition is satisfied in a case where a ring network is formed between the base 2 and the three active modules 3 and the three passive modules 4, and it is determined that that the first transmission condition is not satisfied in other cases.

In this case, the ring network is formed by the controller 2a receiving network joining request data from all the modules 3, 4 after the robot 1 is assembled. Therefore, when the ring network is formed, the controller 2a is in a state of recognizing the total number of connected modules 3, 4 in the ring network. Further, in the embodiment, that "the transmission condition is satisfied" means that a transmittable state is satisfied.

Figure 10:
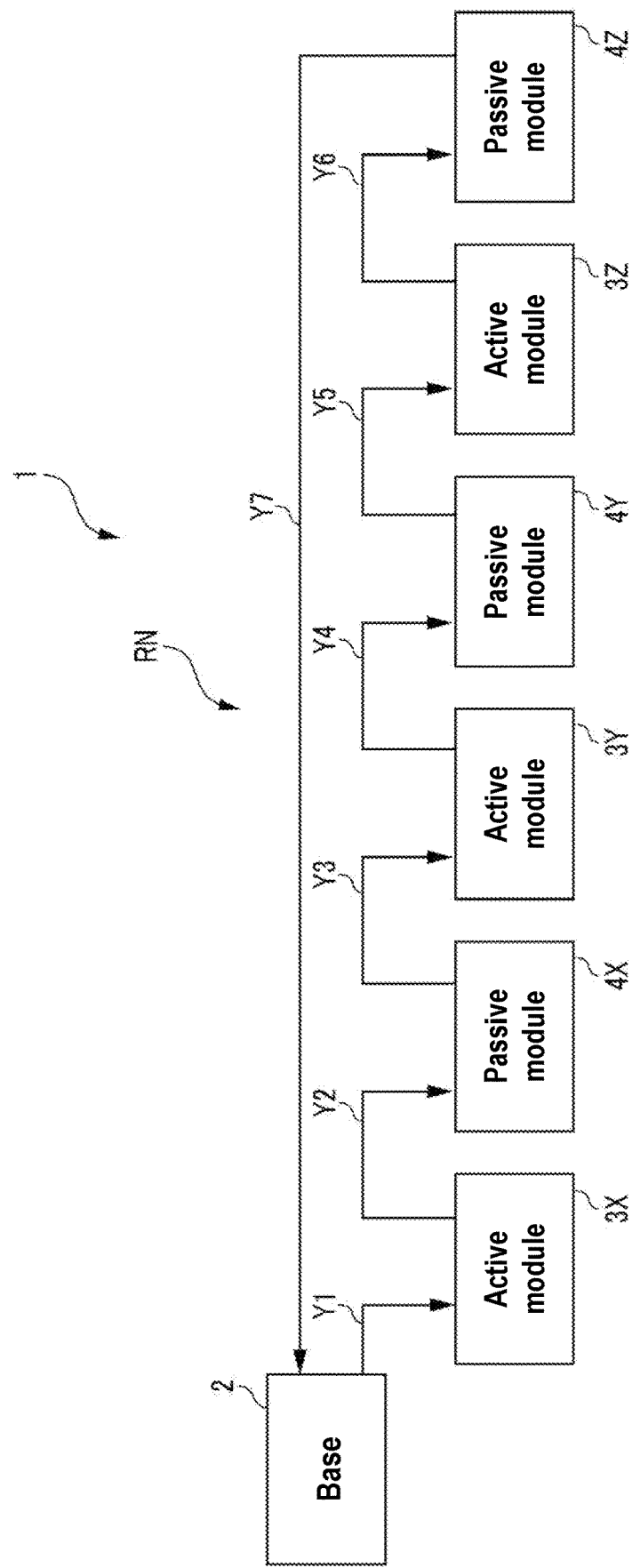
FIG. 10 is a diagram showing a ring network.

Further, in the case of this embodiment, the ring network RN as shown in FIG. 10 is formed as the ring network. In this ring network RN, the end effector 5 is omitted for convenience.

Further, in the case of this ring network RN, various signals such as the ID change request signal and the like flow in only one direction in the order of the base 2⇒the active module 3X⇒the passive module 4X⇒the active module 3Y⇒the passive module 4Y⇒the active module 3Z⇒the passive module 4Z⇒the base 2, as shown by arrows Y1 to Y7.

With reference back to FIG. 5, when the above determination is negative (NO for STEP2 in FIG. 5) and the first transmission condition is not satisfied, this process ends as it is. On the other hand, when this determination is affirmative (YES for STEP2 in FIG. 5) and the first transmission condition is satisfied, the ID change request signal is transmitted to the active module 3X on the downstream side of the ring network RN (STEP3 in FIG. 5).

In this case, the ID change request signal is configured as a packet including a header, a trailer, and a CRC (though not shown), and is transmitted by broadcasting. Further, the header of the packet includes HOP (relay number) and SID (source ID), and the HOP is set to a value of 0 as an initial value. The header corresponds to a rewritable data area.

Further, the SID of the base 2 is set to a predetermined value. In the case of this embodiment, the physical ID of the base 2 is set to "0x3" and the logical ID thereof is set to "0x0," and the physical ID is assigned to the upper 2 bits of the 8-bit SID, and the logical ID is assigned to the remaining lower 6 bits, whereby the SID of the base 2 is set to "0xC0" in hexadecimal notation.

Next, in order to indicate that the ID change request signal has been transmitted, the first initial communication execution completed flag F_DONE1 is set to "1" (STEP4 in FIG. 5), and this process ends.

Next, the second initial communication process will be described with reference to FIG. 6. The second initial communication process is for transmitting the above ID change request signal to the base 2 via the six modules 3X-3Z, 4X-4Z of the ring network RN, and it is performed by the controllers 3a of the active modules 3X-3Z and the controllers 4a of the passive modules 4X-4Z.

Further, in the following description, one of the modules 3, 4 that is executing the second initial communication process and the third initial communication process (to be described later) is referred to as a "corresponding module," and in the ring network RN, the other modules 3, 4 located on the upstream side and the downstream side of the corresponding module are referred to as "upstream modules" and "downstream modules."

Figure 6:
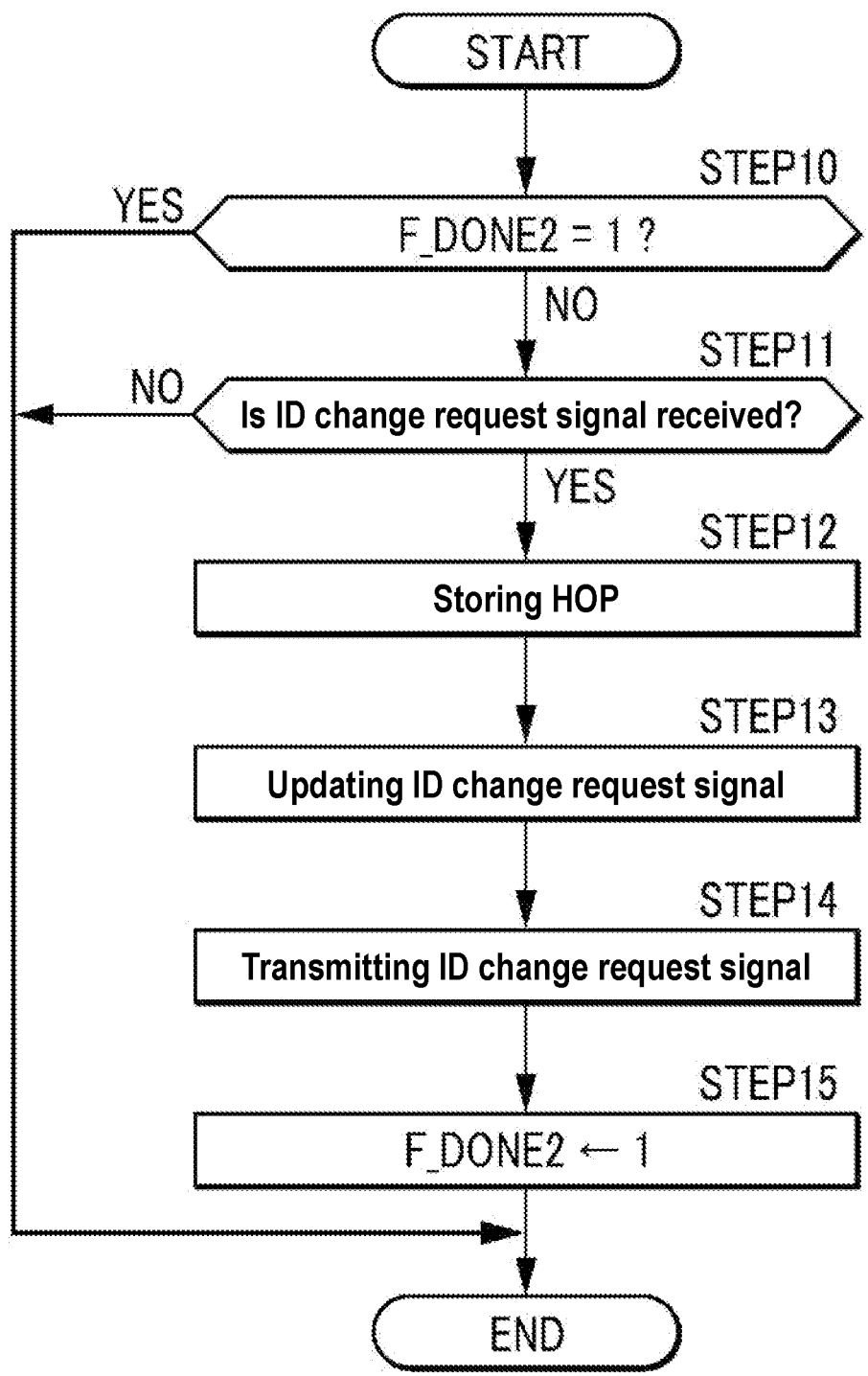
FIG. 6 is a flowchart showing a second initial communication process.

As shown in FIG. 6, first, it is determined whether the second initial communication execution completed flag F_DONE2 is "1" (STEP10 in FIG. 6). When this determination is affirmative (YES for STEP10 in FIG. 6) and the corresponding module has already transmitted the ID change request signal, this process ends as it is.

On the other hand, when this determination is negative (NO for STEP10 in FIG. 6), it is determined whether the corresponding module has received the ID change request signal from the upstream module or the base 2 (STEP11 in FIG. 6). When this determination is negative (NO for STEP11 in FIG. 6) and the ID change request signal is not received, this process ends as it is.

On the other hand, when this determination is affirmative (YES for STEP11 in FIG. 6) and the corresponding module has received the ID change request signal, the HOP value included in the ID change request signal is stored in the memory of the corresponding module (STEP12 in FIG. 6). Hereinafter, the HOP value stored in the memory of the corresponding module is referred to as the "HOP storage value."

Next, the ID change request signal is updated (STEP13 in FIG. 6). Specifically, the ID change request signal is updated by rewriting the HOP included in the ID change request signal to a value incremented by 1.

Next, the ID change request signal updated as described above is transmitted from the corresponding module to the downstream module or the base 2 (STEP14 in FIG. 6). In this case, when the corresponding module is one of the active modules 3X-3Z, the ID change request signal is transmitted to one of the passive modules 4X-4Z on the downstream side thereof, and when the corresponding module is one of the passive modules 4X, 4Y, the ID change request signal is transmitted to one of the active modules 3Y, 3Z on the downstream side thereof. Further, when the corresponding module is the passive module 4Z, the ID change request signal is transmitted to the base 2 on the downstream side thereof.

Next, in order to indicate that the corresponding module has already executed the second initial communication process, the second initial communication execution completed flag F_DONE2 is set to "1" (STEP15 in FIG. 6), and this process ends.

Next, the third initial communication process will be described with reference to FIG. 7. In the third initial communication process, as described below, a new ID of the corresponding module is created, and a module information signal including the new ID and the like is transmitted to the downstream module or the base 2 via the ring network RN, and the third initial communication process is executed by the controller of the corresponding module.

Figure 7:
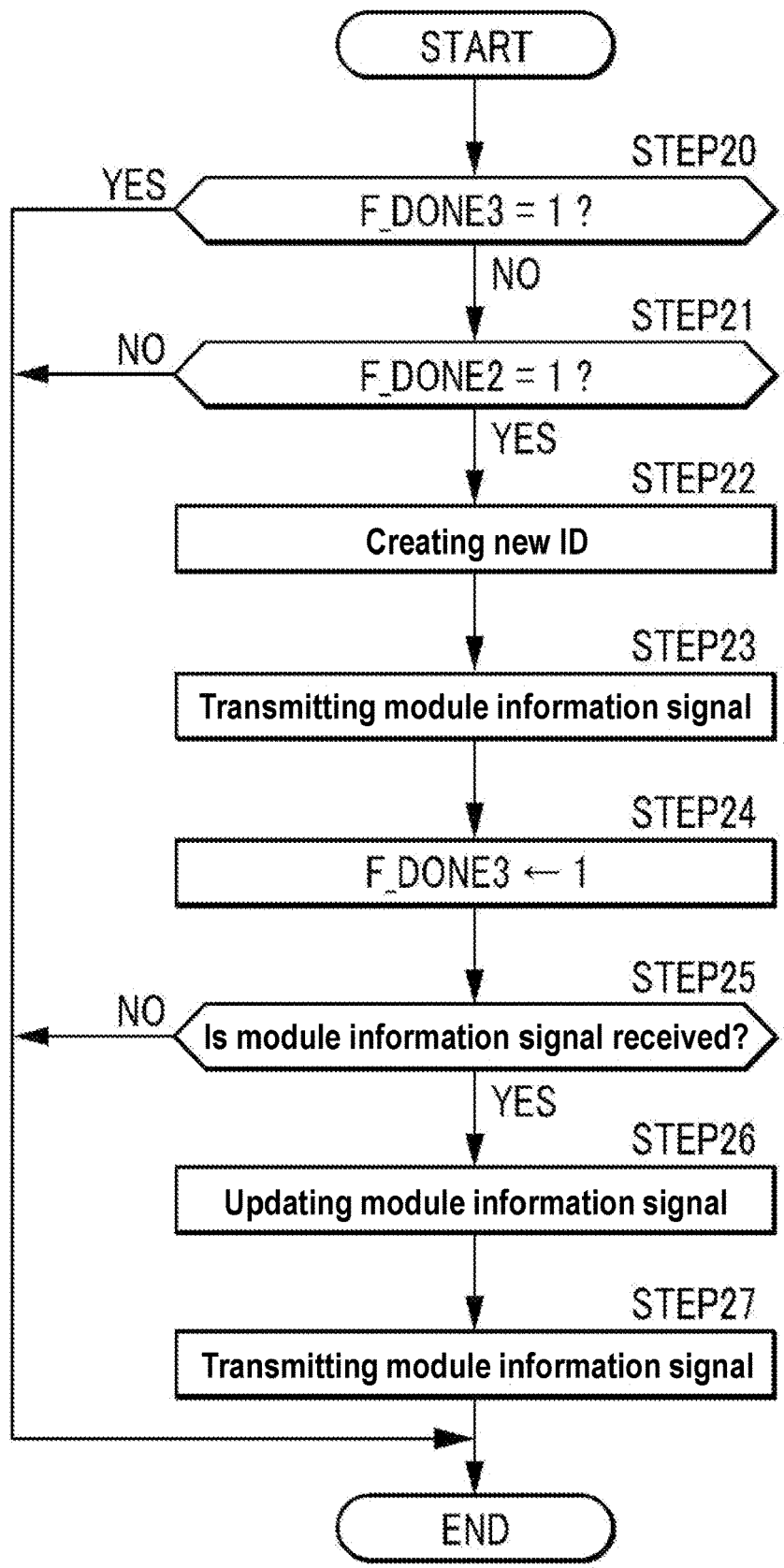
FIG. 7 is a flowchart showing a third initial communication process.

As shown in FIG. 7, first, it is determined whether the third initial communication execution completed flag F_DONE3 is "1" (STEP20 in FIG. 7). When this determination is affirmative (YES for STEP20 in FIG. 7) and the corresponding module has already transmitted the module information signal, the process proceeds to STEP25, which will be described later.

On the other hand, when this determination is negative (NO for STEP20 in FIG. 7), it is determined whether the above second initial communication execution completed flag F_DONE2 is "1" (STEP21 in FIG. 7). When this determination is negative (NO for STEP21 in FIG. 7) and the corresponding module has not transmitted the ID change request signal, the process proceeds to STEP25, which will be described later.

On the other hand, when this determination is affirmative (YES for STEP21 in FIG. 7) and the corresponding module has already transmitted the ID change request signal, a new ID of the corresponding module is created (STEP22 in FIG. 7). Hereinafter, a method for creating the new ID will be described with reference to FIG. 11.

As shown in FIG. 11, in the case of the embodiment, the physical IDs and the logical IDs are set to the common values "0x0" and "0x3F" in the active modules 3X-3Z, and the physical IDs and the logical IDs are set to the common values "0x1" and "0x3F" in the passive modules 4X-4Z. Therefore, even if these IDs are referred to, it can only be recognized whether the module is one of the active modules 3 or the passive modules 4.

Therefore, as shown in FIG. 11, in the six modules 3X, 4X, 3Y, 4Y, 3Z, 4Z, based on the HOP storage values 0 to 5 in the memories 3b, 4b, the provisional IDs (which are provisional logical IDs thereof) are created as "0x00" to "0x05" in hexadecimal notation. Next, in the six modules 3X, 4X, 3Y, 4Y, 3Z, 4Z, the physical IDs are assigned to the upper 2 bits of the new 8-bit IDs, and the provisional IDs are assigned to the remaining lower 6 bits, whereby the new IDs are created as values in hexadecimal notation.

For example, when the corresponding module is the active module 3X, its physical ID is "0x0" and its provisional ID is "0x00," and thus the new ID is "0x00" in hexadecimal notation. Further, when the corresponding module is the passive module 4X, its physical ID is "0x1" and its provisional ID is "0x01," and thus the new ID is "0x41" in hexadecimal notation. By the same method as described above, the new ID is created even when the corresponding module is any of the remaining four modules 3Y, 4Y, 3Z, 4Z.

With reference back to FIG. 7, after creating the new ID of the corresponding module as described above, the module information signal of the corresponding module is transmitted (STEP23 in FIG. 7). This module information signal is created to include the new ID, HOP, and mechanical information of the corresponding module as module information, and the HOP is set to a value of 0.

Further, the mechanical information is configured to include the connection direction of the corresponding module based on the direction of the current flowing in the module in addition to the information such as the shape, weight, center of gravity, moment of inertia and the like of the corresponding module as described above. Further, in the embodiment, the physical ID corresponds to identification information, and the new ID corresponds to new identification information, and the module information signal corresponds to new identification information data and mechanical information data.

Next, in order to indicate that the corresponding module has already transmitted the module information signal, the third initial communication execution completed flag F_DONE3 is set to "1" (STEP24 in FIG. 7).

Next, it is determined whether the module information signal has been received from the upstream module (STEP25 in FIG. 7). When this determination is negative (NO for STEP25 in FIG. 7), this process ends as it is.

On the other hand, when this determination is affirmative (YES for STEP25 in FIG. 7) and the module information signal has been received from the upstream module, the module information signal is updated (STEP26 in FIG. 7). Specifically, the module information signal is updated by rewriting the HOP included in the module information signal to a value incremented by 1.

Next, the updated module information signal is transmitted to the downstream module or the base 2 (STEP27 in FIG. 7), and this process ends.

Next, the fourth initial communication process will be described with reference to FIG. 8. The fourth initial communication process is for receiving module information signals from all the modules 3, 4 after the execution of the first initial communication process described above, and is executed by the controller 2a of the base 2.

Figure 8:
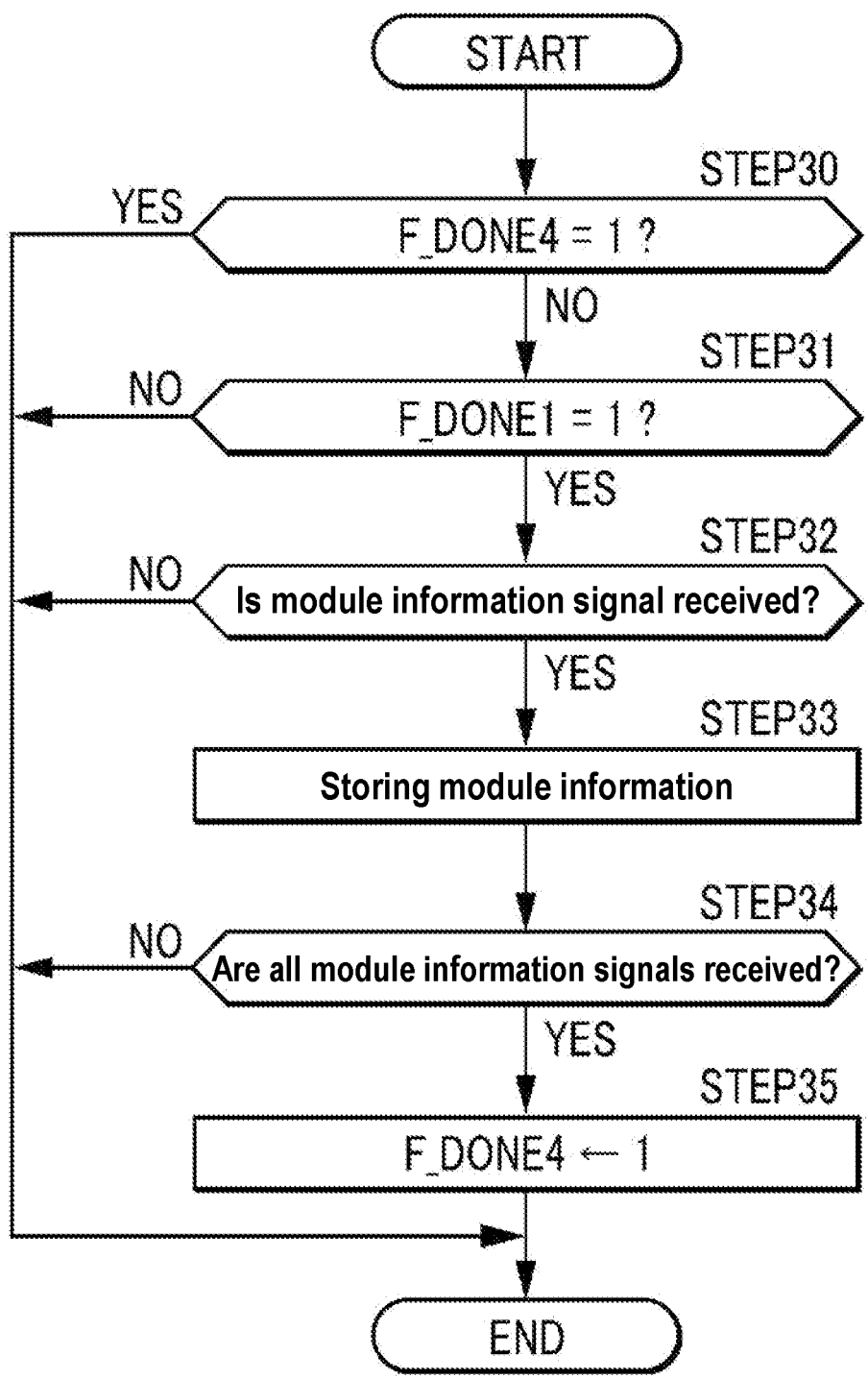
FIG. 8 is a flowchart showing a fourth initial communication process.

As shown in FIG. 8, first, it is determined whether the fourth initial communication execution completed flag F_DONE4 is "1" (STEP30 in FIG. 8). When this determination is affirmative (YES for STEP30 in FIG. 8) and the base 2 has received the module information signals from all the modules 3, 4, this process ends as it is.

On the other hand, when this determination is negative (NO for STEP30 in FIG. 8), it is determined whether the above first initial communication execution completed flag F_DONE1 is "1" (STEP31 in FIG. 8). When this determination is negative (NO for STEP31 in FIG. 8), that is, when the base 2 has not transmitted the ID change request signal, this process ends as it is.

On the other hand, when this determination is affirmative (YES for STEP31 in FIG. 8) and the base 2 has already transmitted the ID change request signal, it is determined whether the above module information signal has been received from any of the modules 3, 4 (STEP32 in FIG. 8). When this determination is negative (NO for STEP32 in FIG. 8) and the module information signal is not received, this process ends as it is.

On the other hand, when this determination is affirmative (YES for STEP32 in FIG. 8) and the above module information signal has been received, the module information included in the module information signal is stored (STEP33 in FIG. 8). Specifically, the new ID, HOP, and mechanical information of the active module 3 or the passive module 4 in the module information are stored in the memory in the controller 2a.

Next, it is determined whether all module information signals (that is, module information signals from all the modules 3, 4) have been received (STEP34 in FIG. 8).

Specifically, when all the module information including the HOP having a value of 0 to 5 is stored in the memory in the controller $2a$, it is determined that all the module information signals have been received, and it is determined that not all the module information signals have been received in other cases. When this determination is negative (NO for STEP34), this process ends as it is.

On the other hand, when this determination is affirmative (YES for STEP34 in FIG. 8) and the module information signals from all the modules 3, 4 have been received, in order to indicate this, the fourth initial communication execution completed flag F_DONE4 is set to "1" (STEP35 in FIG. 8), and this process ends.

As described above, when the fourth initial communication process is executed and the module information signals from all the modules 3, 4 have been received at the base 2, the base 2 can obtain the connection order of the active modules 3 and the passive modules 4 based on the HOP and the new ID in each module information signal, and can obtain the connection direction of the modules 3, 4 according to the direction of the signal flowing in the modules 3, 4.

As a result, the base 2 can calculate the position of the center of gravity, the moment of inertia and the like of the entire robot 1 in the assembled robot 1 and can obtain the performance such as the movable range, the maximum load and the like of the robot 1 based on the above information and the mechanical information of the modules 3, 4.

Figure 12:
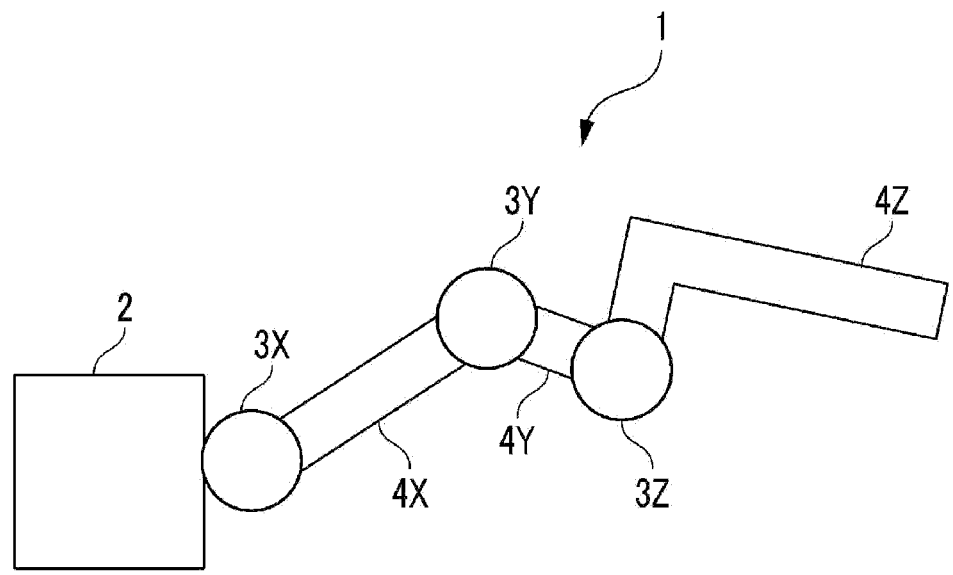
FIG. 12 is a diagram showing an example of the assembly state of the robot.
Figure 13:
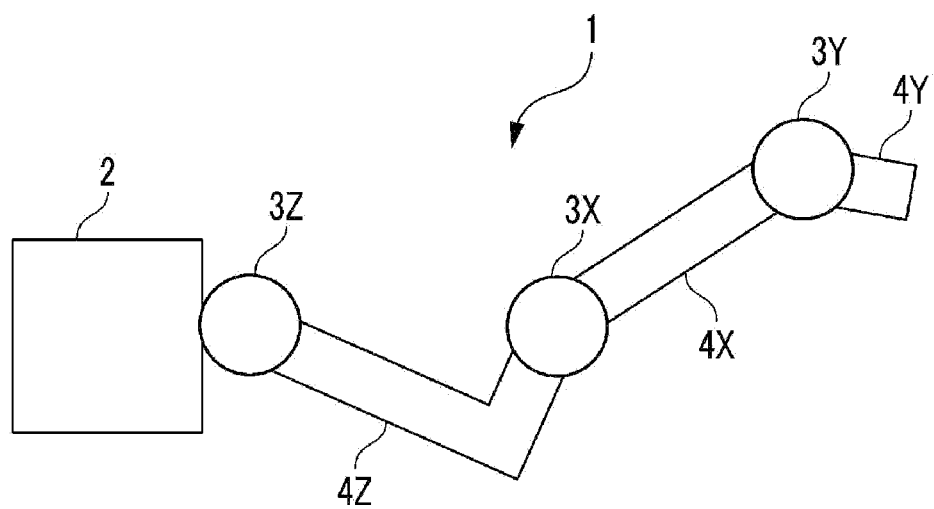
FIG. 13 is a diagram showing another example of the assembly state of the robot.

The reason for using such a method is as follows. For example, when a state in which six modules 3X, 4X, 3Y, 4Y, 3Z, 4Z are connected to the base 2 as shown in FIG. 12 is compared with a state in which they are connected as shown in FIG. 13, due to differences in the module connection order and connection direction between the two states, mechanical changes such as the position of the center of gravity, the moment of inertia and the like, and kinematic changes due to differences in the connection direction occur. As a result, there will be a difference in performance such as the movable range, the maximum load and the like of the robot 1.

Therefore, in the embodiment, the above first to fourth initial communication processes are executed for appropriately obtaining changes in the performance such as the movable range, the maximum load and the like of the robot 1 due to the assembly state of the robot 1 (that is, the connection order and the connection direction of the modules 3, 4).

Next, the operation control process of the robot 1 will be described with reference to FIG. 9. The control process is for controlling the operation of the robot 1, and is executed by the controller $2a$ of the base 2.

Figure 9:
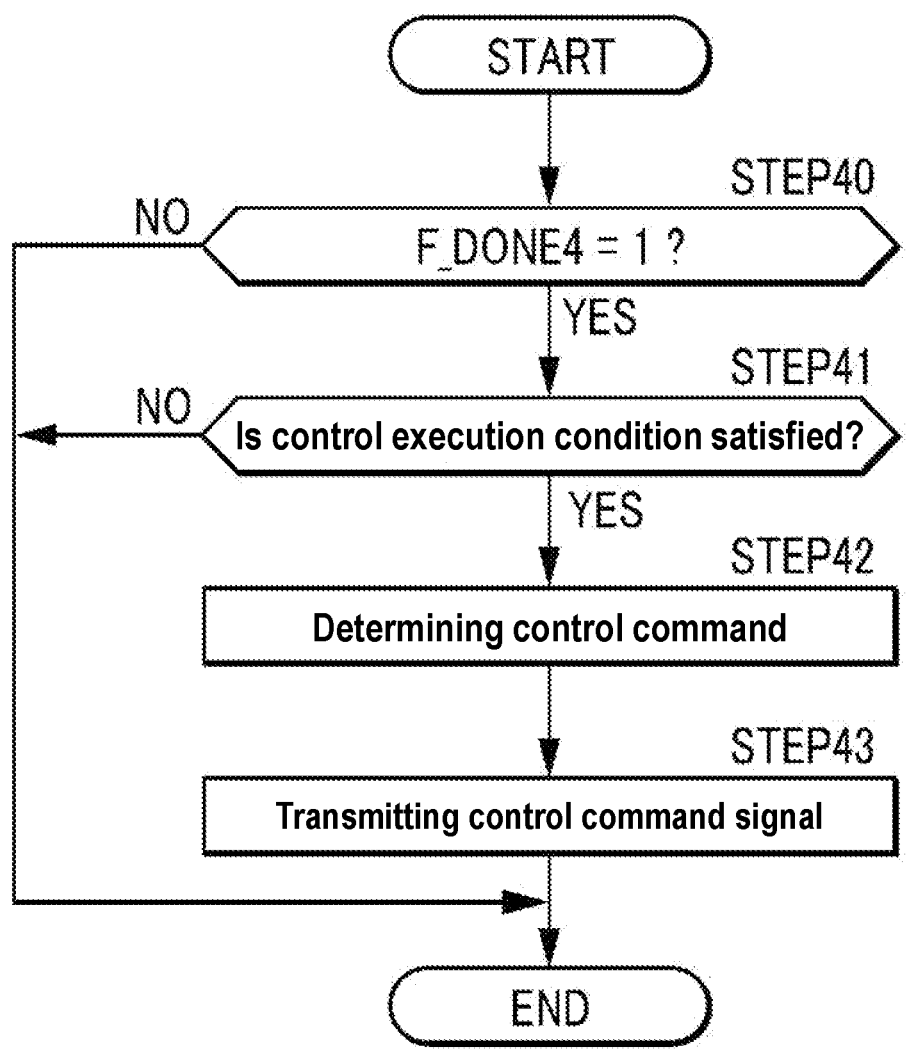
FIG. 9 is a flowchart showing a robot operation control process.

As shown in FIG. 9, first, it is determined whether the above fourth initial communication execution completed flag F_DONE4 is "1" (STEP40 in FIG. 9). When this determination is negative (NO for STEP40 in FIG. 9) and the module information signals from all the modules 3, 4 have not been received, this process ends as it is.

On the other hand, when this determination is affirmative (YES for STEP40 in FIG. 9), it is determined whether a control execution condition is satisfied (STEP41 in FIG. 9). In this case, it is determined that the control execution condition is satisfied when a user command is input by the user of the robot 1, and it is determined that the control execution condition is not satisfied in other cases.

When this determination is negative (NO for STEP41 in FIG. 9), this process ends as it is. On the other hand, when this determination is affirmative (YES for STEP41 in FIG. 9) and the control execution condition is satisfied, a control command is determined (STEP42 in FIG. 9). In this case, three control commands are determined for each of the three active modules 3, and one control command is determined for the end effector 5. Further, these control commands are determined based on the user command, the sensor information, and the number of connected modules, the connection direction and the mechanical information of the modules 3, 4 described above.

Next, four control command signals respectively including the four control commands are output to the three active modules 3 and the end effector 5 (STEP43 in FIG. 9), and this process ends.

As described above, according to the robot 1 of the embodiment, the ID change request signal whose HOP is set to the value 0 is transmitted from the controller $2a$ of the base 2 to the active module 3 on the downstream side of the ring network RN. Then, in the controller $3a$ of the active module 3, the HOP value included in the ID change request signal is stored in the memory $3b$, and the ID change request signal is updated by rewriting the HOP of the ID change request signal to a value incremented by 1. Next, the updated ID change request signal is transmitted to the passive module 4 on the downstream side, and the same process as described above is executed by the passive module 4.

Further, in each of the modules 3, 4, a provisional ID is created from the HOP storage value stored in the memories $3b$, $4b$, and a new ID for each module is created to indicate the connection order and type of each module based on this provisional ID and the physical ID stored in the memories $3b$, $4b$. Then, the module information signal including the new ID, HOP, and mechanical information of each module is eventually transmitted to the base 2 while being relayed by the modules 3, 4 of the ring network RN.

In this way, after the robot 1 is assembled, the base 2 can appropriately obtain the connection order and connection direction of the active modules 3 and the passives module 4 based on the new ID, HOP, and mechanical information of the module information signal from each module. In addition to this, the mechanical information of the active modules 3 includes information such as shape, weight, center of gravity, moment of inertia, joint angle limit, speed limit, current limit and the like, and the mechanical information of the passive modules 4 includes information such as shape, weight, center of gravity, moment of inertia and the like.

Therefore, the base 2 can calculate the position of the center of gravity, the moment of inertia and the like of the entire robot 1 in the assembled robot 1 and can obtain the performance such as the movable range, the maximum load and the like of the robot 1 based on the connection order and connection direction of the active modules 3 and the passive modules 4 and the mechanical information of the modules 3, 4. As a result, after the robot 1 is assembled, the base 2 can appropriately determine the control commands to the modules 3, 4 and the end effector 5 based on the above information, and can optimally control the robot 1 by the control commands.

Further, the embodiment is an example in which the robot 1 is used as the operating device, but the operating device of the disclosure is not limited thereto, and it is sufficient that the operating device is of a modular type which connect multiple modules in series and detachably, which is assembled by detachably connecting a module on one end side of the multiple modules connected in series to a command module, whose operation is controlled by a control command from the command module, and in which a ring network capable of transmitting data in one direction is formed when the module on the one end side is connected to the command module. For example, a moving body such as a train may be used as the operating device.

Further, the embodiment is an example in which the base 2 is used as the command module, but the command module of the disclosure is not limited thereto, and it is sufficient that the operation of the operating device may be controlled by a control command from the command module. For example, the active module 3 or the passive module 4 may be used as the command module.

Further, the embodiment is an example in which three active modules 3 are used, but the number of active modules 3 is not limited thereto, and there may be one or more active modules 3. Similarly, the number of passive modules 4 is not limited to three in the embodiment, and there may be one or more passive modules 4.

Further, the embodiment is an example in which it is configured that the mechanical information of each active module 3 is stored in the memory 3b and the mechanical information of each passive module 4 is stored in the memory 4b, but it may be configured that the mechanical information of all the active modules 3 and the passive modules 4 are stored in advance in the memory in the controller 2a of the base 2.

In addition, the embodiment is an example in which the module information signal is transmitted after the ID change request signal is transmitted in each of the modules 3, 4, but it may be configured that the ID change request signal and the module information signal are simultaneously transmitted.

Further, the embodiment is an example in which the three active modules 3 are configured to be different from each other and the three passive modules 4 are configured to be different from each other, but instead of this, a standardized module may be used as at least one of the active modules 3 and the passive modules 4. In that case, the module information signal may be configured so as not to include the mechanical information of the at least one of the active modules 3 and the passive modules 4.

Further, the embodiment is an example in which the active modules 3 and the passive modules 4 are alternately connected, but instead of this, multiple active modules 3 may be connected in series, or multiple passive modules 4 may be connected in series.

Further, the embodiment is an example in which it is configured that the mechanical information of the active modules 3 includes information such as shape, weight, center of gravity, moment of inertia, joint angle limit, speed limit, current limit and the like, and the mechanical information of the passive modules 4 includes information such as shape, weight, center of gravity, moment of inertia and the like, but the mechanical information of the disclosure is not limited thereto, and it is sufficient that the mechanical information indicates at least one of the physical property and the operating characteristic of the modules. For example, it may be configured that the mechanical information of the active modules 3 includes one of information such as shape, weight, center of gravity and moment of inertia, and information such as joint angle limit, speed limit, current limit and the like.

In addition, the embodiment is an example in which the active module 3 is connected to the base 2 in the robot 1, but it may be configured that the passive module 4 is connected to the base 2.

Further, the embodiment is an example in which it is configured that the ring network RN does not include the end effector 5 for convenience, but it may be configured that the ring network includes the end effector 5.

What is claimed is:

1. An operating device which is of a modular type, in which a plurality of modules are detachably connected in series, which is assembled by detachably connecting a module on one end side of the plurality of modules connected in series to a base, whose operation is controlled by a control command from the base, and in which a ring network capable of transmitting data in one direction is formed when the module on the one end side is connected to the base, wherein the base comprises:
    a first processor which generates confirmation data with a rewritable data area, and is capable of transmitting the confirmation data to the module on a downstream side in the one direction of the ring network and capable of receiving various data from the module on an upstream side in the one direction of the ring network, wherein each of the plurality of modules comprises:
    a second processor which is capable of receiving the confirmation data and data other than the confirmation data from one of the base and each of the modules on the upstream side in the one direction of the ring network, and rewrites a relay number includes in the data area of the confirmation data to a value incremented by 1 when the confirmation data is received by the second processor; and a memory which stores identification information indicating a type of each of the modules, wherein the second processor creates new identification information that is novel identification information of each of the modules to indicate a connection order and the type of each of the modules based on the relay number of the confirmation data received by the second processor and the identification information of each of the modules stored in the memory, and the second processor is capable of transmitting the confirmation data whose relay number has been rewritten by the second processor and new identification information data including the new identification information to one of the base and each of the modules on the downstream side in the one direction of the ring network.

2. The operating device according to claim 1, wherein the type of the module has two types including an active module with an actuator and a passive module without an actuator.

3. The operating device according to claim 1,
    wherein the memory of the module further stores mechanical information indicating at least one of a physical property and an operating characteristic of the module,
    in addition to the confirmation data and the new identification information data, the second processor of the module is capable of transmitting mechanical information data including the mechanical information to one of the base and each of the modules on the downstream side in the one direction of the ring network, and
    the first processor determines the control command in response to the mechanical information and the new identification information from the plurality of modules.

4. The operating device according to claim 2,
    wherein the memory of the module further stores mechanical information indicating at least one of a physical property and an operating characteristic of the module, in addition to the confirmation data and the new identification information data, the second processor of the module is capable of transmitting mechanical information data including the mechanical information to one of the base and each of the modules on the downstream side in the one direction of the ring network, and the first processor determines the control command in response to the mechanical information and the new identification information from the plurality of modules.

\* \* \* \* \*